United States Patent [19]

Koda

[11] 4,212,039
[45] Jul. 8, 1980

[54] VTR TAPE DRIVE SYSTEM

[75] Inventor: Minoru Koda, Hirakata, Japan

[73] Assignee: Matsushita Electrical Industrial Co., Ltd., Kadoma, Japan

[21] Appl. No.: 915,304

[22] Filed: Jun. 12, 1978

Related U.S. Application Data

[63] Continuation of Ser. No. 733,936, Oct. 19, 1976, abandoned.

[30] Foreign Application Priority Data

Oct. 20, 1975 [JP] Japan .............................. 50-126643

[51] Int. Cl.² .......................................... G11B 15/18
[52] U.S. Cl. ...................................... 360/73; 360/70; 318/696
[58] Field of Search ............... 360/73, 70, 74, 10, 360/9, 8, 19; 358/148, 150; 318/314, 318, 685, 696

[56] References Cited

U.S. PATENT DOCUMENTS

| | | | |
|---|---|---|---|
| 3,510,577 | 5/1970 | Amass | 360/73 |
| 3,588,334 | 6/1971 | Camras | 360/10 |
| 3,636,252 | 1/1972 | Kowal | 360/14 |
| 3,668,492 | 6/1972 | Konishi | 360/73 |
| 3,777,063 | 12/1973 | Meacham | 358/150 |
| 3,826,966 | 7/1974 | Nagasaka | 318/696 |
| 3,849,795 | 11/1974 | Koda | 360/73 |
| 3,931,639 | 1/1976 | Arter | 360/70 |
| 3,959,818 | 5/1976 | Iketaki | 360/70 |
| 3,967,179 | 6/1976 | Loyzim | 318/696 |
| 3,978,521 | 8/1976 | Langer | 360/73 |
| 4,001,885 | 1/1977 | Ikushima | 360/70 |

OTHER PUBLICATIONS

"Circuits, Devices and Systems", by R. J. Smith, ©1966, John Wiley and Sons, Inc., pp. 558-561.

*Primary Examiner*—James W. Moffitt
*Assistant Examiner*—Alan Faber
*Attorney, Agent, or Firm*—Wenderoth, Lind & Ponack

[57] ABSTRACT

The present invention is a novel tape drive system in a magnetic recording and reproducing device for recording a video signal intermittently by a rotary magnetic head and recording an audio signal continuously over a wide range of predetermined tape speeds. In a high speed range a conventional brushless DC motor drives the tape. In a low speed range the same motor is driven by additional pulses. The lowest speed in the high speed range is higher than the highest speed in the low speed range.

3 Claims, 13 Drawing Figures

VTR TAPE DRIVE SYSTEM

The present application is a continuation of application Ser. No. 733,936, filed Oct. 19, 1976, now abandoned.

BACKGROUND OF THE INVENTION

This invention relates to a magnetic recording and reproducing device, and more particularly to a magnetic recording and reproducing device for recording video signals intermittently on a magnetic tape by rotary heads at various tape moving speeds.

Usually, in a magnetic recording and reproducing device for recording a video signal, which is taken out at every n fields (n being an integer), intermittently on a magnetic tape moving at a speed of 1/n of the standard speed, in order to provide for the conventional tape moving speed and a low tape moving speed, separate motors for the different speeds are used with one motor provided for the conventional speed and the other for the low speed. With this arrangement it is required to provide a number of motors by number corresponding to the number of tape moving speeds and this is undesirable because of the high cost and the complex mechanism needed for switching the driving operation among the different motors.

Alternatively, a pulse motor can be used for moving the magnetic tape and the tape moving speed can be changed by changing pulse frequency applied to the pulse motor. However, because the pulse motor rotates intermittently, especially in the case when the frequency of the pulses applied to the motor is low, there is caused a large deviation in the tape moving speed and this makes it difficult to hear an audio signal recorded continuously at the edge of the tape owing to wow and flutter of the tape. Moreover, in the case of a high frequency of the pulse being applied to the motor, there is a drawback in that a large amount of power is required to drive the motor well.

SUMMARY OF THE INVENTION

Therefore, an object of the present invention is to provide a novel and improved magnetic recording and reproducing device in which a video signal is recorded intermittently on a magnetic tape which is moved by a novel driving system at various speeds.

An object of the present invention is to provide a novel tape driving system with a wide range of preselected speeds employing a single motor.

Another object of the present invention is to provide such a novel tape driving system which can be operated at a low power.

A further object of the present invention is to provide such a novel tape driving system which has improved characteristics with respect to wow and flutter of an audio signal recorded continuously on a magnetic tape.

A further object of the present invention is to provide a novel circuit configuration for such a novel tape driving system which overcomes the conventional drawbacks as described above.

In achieving these objects, the present invention employs a brushless motor having a uniform rotation obtained by multi-poles magnetization as the motor for moving the magnetic tape, and the motor is driven as a conventional DC brushless motor within a certain range of values of the tape moving speed and is driven forcedly by additional pulses at a very low tape moving speed.

The foregoing objects are achieved by a magnetic recording and reproducing device according to the present invention, which comprises: a brushless DC motor for moving said magnetic tape at various tape moving speeds which motor has a rotor, a stator core having main windings wound thereon facing to said rotor, and a position detecting means for detecting the rotational position of said rotor: current supply means for supplying current to said main winding so as to drive said motor; additional input means which is operated by outer pulse applied thereto, said position detecting means and said an additional input means being coupled to said current supply means so as to supply current thereto; and selecting means for selecting between said position detecting means and said additional input means so that said motor is driven by said position detecting means for tape speeds in a first tape moving speed range of said magnetic tape where playback of the audio signal can be carried out in a practical way and driven by said additional input means for tape speeds in a second tape moving speed range lower than said first range.

BRIEF DESCRIPTION OF THE DRAWINGS

These and other objects and the features of the present invention will be apparent from consideration of the following description of a preferred embodiment together with the accompanying drawings in which.

DETAILED DESCRIPTION OF A PREFERRED EMBODIMENT

Figure 1:
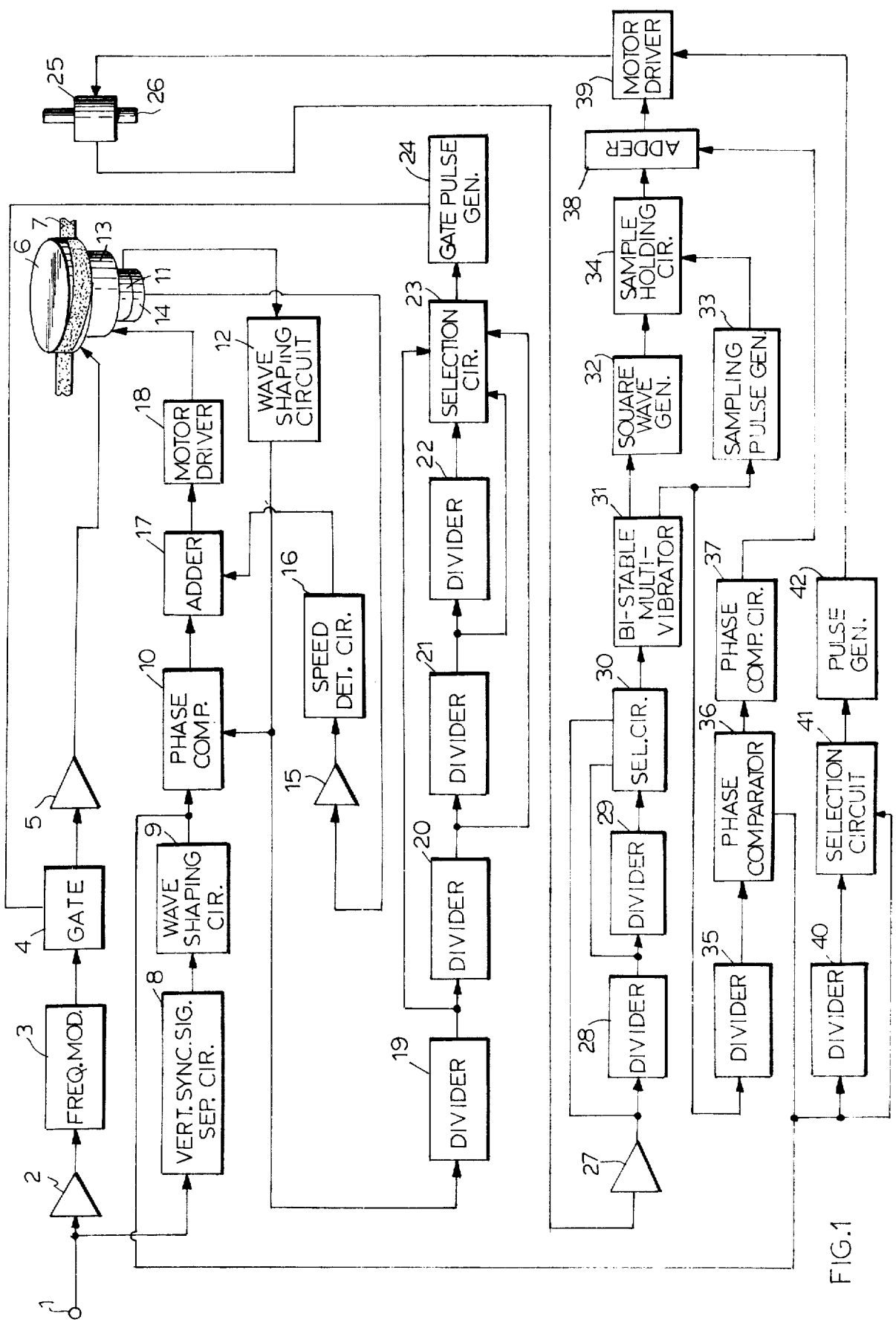
FIG. 1 is a block diagram of an embodiment of a magnetic recording device according to the present invention.

In a magnetic recording and reproducing device according to the present invention, a brushless DC motor is used as a capstan motor for moving a magnetic tape, and in order to change the tape moving speed correctly, the speed of rotation of the motor is changed by controlling the rotation phase thereof. However, it is difficult to rotate a brushless DC motor correctly at a very low speed range as described in the following.

That is, the amount of load and the amount of change of load applied to the magnetic tape moving motor are nearly constant, respectively, regardless of the tape moving speed. Therefore, the ratio of the change of the speed of rotation with respect to the load should be constant regardless of the speed of rotation of the motor. Accordingly, in the case of a very low speed of rotation of the motor, the ratio of the change of the speed of rotation relative to change of the load should be made very small.

In controlling the speed of rotation of a motor, lowering the ratio of the change of the speed of rotation relative to the change of the load requires an increase in the gain of speed control system. Such an increase of the gain of the speed control system results in a shift of the frequency response characteristic of the speed control system including the motor to a high frequency in proportion to that gain. Therefore, in order to rotate the motor in a stable manner, it is necessary that the speed control system including the motor have no phase delay up to a high frequency range.

On the other hand, the motor speed detecting frequency from a rotation speed detector forming part of the motor, which is essential for controlling the speed of rotation of the motor, is proportional to the speed of rotation of the motor. Therefore, when considering the change in the ratio of the speed of rotation relative to a load applied to the motor, there is naturally a limit for rotating the motor stably at a very low speed, and this is true even when rotating the motor by controlling the rotation phase of the motor. For the above reason, according to the invention, at a very low speed of rotation of the tape moving motor, the conventional brushless DC motor is driven forcedly by additional pulses in order to prevent a change of the tape moving speed due to a change of the load on the motor.

The range of the tape moving speeds at which the motor is driven by additional pulses is determined as follows taking into consideration the wow and flutter of the audio signal and the equal interval of magnetic tracks intermittently formed by the rotary heads. That is, for recording the video signal, the range of tape moving speeds is lower than tape moving speed at which the audio signal continuously recorded at the edge portion of the magnetic tape can be processed practically. In order to form the magnetic tracks at equal intervals the tape speed is set in a range where the additional pulses for driving the motor do not occur during a time when one magnetic track is being formed by a rotary head rotating synchronously with the frame frequency of the video signal, that is in a range of the tape moving speeds corresponding to the frequency of the additional pulses which is less than the frame frequency (30 Hz). At this low speed range, although the audio signal is not recorded, the video signal can be recorded for a very long time.

When an additional pulse is applied to the motor, the motor responds to that pulse and rotates up to the next stable point. When this pulse is applied during a period when a magnetic track is formed, the formed track has a staircase shape and the linearity of the magnetic track is degraded. Further, when the number of additional pulses applied to the motor during each period for one magnetic track is different, although the average tape moving speed over a long period of time is not changed, the intervals between the adjacent magnetic tracks becomes unequal. In order to prevent such a situation the frequency of the additional pulses to be applied to the motor is set to be lower than 30 Hz and further to be synchronous with the rotary head. In this case, the power required for driving the motor rotated by the additional pulse of such a low frequency will be small because the speed of rotation is very low.

Now, it will be assumed that the present invention is applied to a standard I-type magnetic recording and reproducing device using two rotary magnetic heads. In such a standard video tape recorder, the conventional magnetic tape moving speed is set to be 19.05 cm/sec (EIAJ Standard, Electric Industry Association of Japan). The magnetic tape moving speed for recording the video signal intermittently is arranged, for example, to about 2.4 cm, 1.2 cm/sec, 0.6 cm/sec and 0.3 cm/sec which is ¼, 1/16, 1/32 and 1/64 of the above mentioned conventional speed of 19.05 cm/sec, respectively. On the other hand, the wave length of the audio signal, which is recorded continuously on the track at the edge portion of the tape, for stable playback is in a range of 4 to 5 micron. Considering the practical frequency band of the audio signal, the tape moving speed at which the audio signal can be stably processed is in a range higher than about 1.2 cm/sec (corresponding to 1/16 of the usual speed) among the above described speeds.

Accordingly, in the present invention a number of preselected type moving speeds are available. When the selected tape moving speed is in a range of the tape moving speed higher than 1.2 cm/sec, the motor is used as a conventional brushless DC motor the rotation phase of which is controlled by means of a reference signal, so as to improve the wow and flutter characteristics of the audio signal, to reduce the amount of power required for driving the motor and to hold the correct moving speed of the magnetic tape. When the tape moving speed selected is in the range where the tape moving speed is lower than 1.2 cm/sec, the above reference signal is used as an additional pulse for driving the motor, with such a control that the additional pulse is not applied to the motor while a magnetic track is being formed by the rotary magnetic head and that the interval between the adjacent tracks becomes equal, so as to maintain the correct moving speed of the magnetic tape.

An embodiment of the invention will be described in more detail in the following with reference to the drawings. In the block diagram of FIG. 1, a video signal applied to an input terminal designated by reference numeral 1 is amplified by an amplifier 2 and applied to a frequency modulator 3. The output signal of the frequency modulator 3 is gated for a time slightly longer than one field at a gate circuit 4 and applied to a recording amplifier 5. The signal amplified by the amplifier 5 is recorded on the magnetic tape 7 by a magnetic head (not shown) mounted on a rotary head assembly 6.

The video signal at the input terminal 1 is also applied to a vertical synchronizing signal separating circuit 8 where the vertical synchronizing signal is separated from the video signal. The separated vertical synchronizing signal is wave-shaping by a wave-shaping circuit 9 and applied to a phase comparator 10. Together the vertical synchronizing signal separating circuit 8 and wave-shaping circuit 9 comprises a reference signal generating means. On the other hand, a rotation phase detector 11 associated with the rotary head assembly 6 generates one pulse for each rotation of the rotary head assembly 6, and this pulse is applied to the phase comparator 10 after being subjected to wave-shaping by a wave-shaping circuit 12. Thus, the phase difference between the rotation phase of the rotary head assembly 6 and the vertical synchronizing signal of the video signal applied to the input terminal 1 is detected.

The rotary head assembly 6 is rotated by a motor 13 mounted at the lower portion thereof. A rotation speed detector 14, which is mounted under the motor 13, generates a signal having a frequency corresponding to the speed of rotation of the motor 13, and that signal is amplified by an amplifier 15 and applied to a speed detecting circuit 16, which converts the frequency corresponding to the rotation speed of the motor 13 into a voltage. The output of the phase comparator 10 and the output of the speed detecting circuit 16 are applied to an adder 17, and the output signal thereof is applied to a motor driver 18, which provides the driving power to the motor 13. Accordingly, the rotary head assembly is rotated synchronously with the vertical synchronizing signal of the video signal applied to the input terminal 1.

The output of the wave-shaping circuit 12 is also applied to a first gate signal divider 19, the output of which is applied to a second gate signal divider 20. In turn, the output of the divider 20 is applied to a third gate signal divider 21, and the output of the latter is applied to a fourth gate signal divider 22. Each of these outputs of the dividers 19, 20, 21 and 22 is also applied to a manually set selection circuit 23, which selects an output, depending on the tape speed desired which is then applied to a gate pulse generator 24. Selection circuit 20 may comprise a single pole, multiple throw switch. The gate pulse generator 24 is connected to the gate circuit 4 and determines the gating time thereof. The frequency dividing ratios of the first to the fourth dividers 19, 20, 21 and 22 are decided according to the time for recording the video signal intermittently on the tape 7, and also they must correspond to reduction ratio of a capstan motor 25 described hereinafter.

The magnetic tape 7 is moved by the capstan motor 25, and a frequency generator 26 for generating a frequency corresponding to the speed of rotation of the motor 25 is mounted on the motor 25. The output of the generator 26 is amplified by a motor signal amplifier 27, and the output thereof is applied to a first motor signal divider 28 for changing the speed of rotation of the capstan motor 25. In turn, the output of the first divider 28 is applied to a second motor signal divider 29. The output of the amplifier 27 and each of the outputs of these dividers 28 and 29 is also applied to a selection circuit 30. The selection circuit selects one of the outputs of the dividers depending on the speed desired and the output of the selection circuit 30 is applied to a bi-stable multivibrator 31. Selection circuit 30 may comprise a single pole, multiple thro switch. The first output of the bi-stable multivibrator 31 triggers a square wave generator 32, and the second output thereof is applied to a sampling pulse generator 33. The pulse from the sampling pulse generator 33 is applied to a sample holding circuit 34 for sampling the square wave from the square wave generator 32. According to the configuration described above, when the speed of rotation of the capstan motor 25 changes, the frequency of the frequency generator 26 changes, and thus the period of the bi-stable multivibrator 31 changes and then there is provided a voltage change corresponding to the above change of the period at the sample holding circuit 34.

On the other hand, the second output of the bi-stable multivibrator 31 is also applied to a multivibrator signal divider 35. The dividing ratio of the divider 35 is set so that the output frequency thereof becomes the same as or n times or 1/n of the frequency of the vertical synchronizing signal of the video signal (n being an integer). The output of the divider 35 and the output of the wave-shaping circuit 9 are applied to a phase comparator 36, where the rotation phase of the capstan motor 25 is compared with the phase of the vertical synchronizing signal of the video signal applied to the input terminal 1. The phase error voltage from the phase comparator 36 is applied to an adder 38 through a phase compensating circuit 37. On the other hand, the speed error signal from the sample holding circuit 34 is also applied to the adder 38. The output of the adder 38 is applied to a capstan motor driving circuit 39 which is described in detail hereinafter, and power for rotating the motor 25 is provided therefrom to the motor 25.

In order to rotate the capstan motor 25 by the additional pulse as described hereinbefore, the output of the wave-shaping circuit 9 is applied to a shaped wave signal divider 40 and a selection circuit 41. The selection circuit 41 selects one of these inputs thereto depending on the tape speed desired and the output signal of the selection circuit 41 is applied to a pulse generator 42, and the output of the latter is applied to the capstan motor driving circuit 39. Selection circuit 41 may comprise a single pole, multiple throw switch. The selection circuite 23, 30 and 41 are manually set in conjunction with each other depending on the tape speed desired. The details of the capstan motor driving circuit 39 and the pulse generator 42 are described hereinafter. Because the other blocks shown in FIG. 1 represent conventional circuits well known to those skilled in art, the detailed description of them is omitted.

Figure 2:
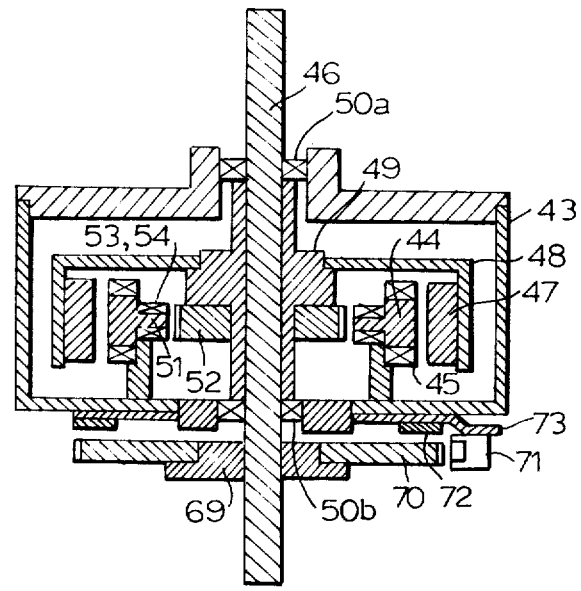
FIG. 2 is a cross sectional view of a capstan motor used for the device of FIG. 1.

FIG. 2 is a cross sectional view of the capstan motor 25, in which a stator of a conventional brushless motor comprises a stator core 44 mounted on a housing 43 and a main winding 45 wound on the stator core 44 in three phases. A ring magnet 47, which is magnetized to have 16 alternating N and S poles, is mounted on a rotor 48 so that the inner magnetic pole surfaces face to the stator core 44. The rotor 48 is attached to a boss 49 on shaft 46 which is rotatably mounted in the housing 43 on bearings 50a and 50b at the opposite ends of the boss 49.

On the inside of the stator core 44, there is provided a position detecting stator 51 having three pairs of projections. Facing the position detecting stator 51, a position detecting rotor 52 for indicating the rotational position of the rotor 48 is attached to the boss 49. A group of primary coils 53a, 53b and 53c (generally indicated by numeral 53) and a group of secondary coils 54a, 54b and 54c (generally indicated by numeral 54) are wound on the position detecting stator 51. In FIG. 2, these coils are shown at the same position. On the other hand, the outer periphery of the position detecting rotor 52, there are provided projections for changing the electro-magnetic coupling between paired primary and secondary coils (53a and 54a, 53b and 54b, 53c and 54c). The number of these projections is small, being half the number of the poles of the magnet 47.

Figure 3:
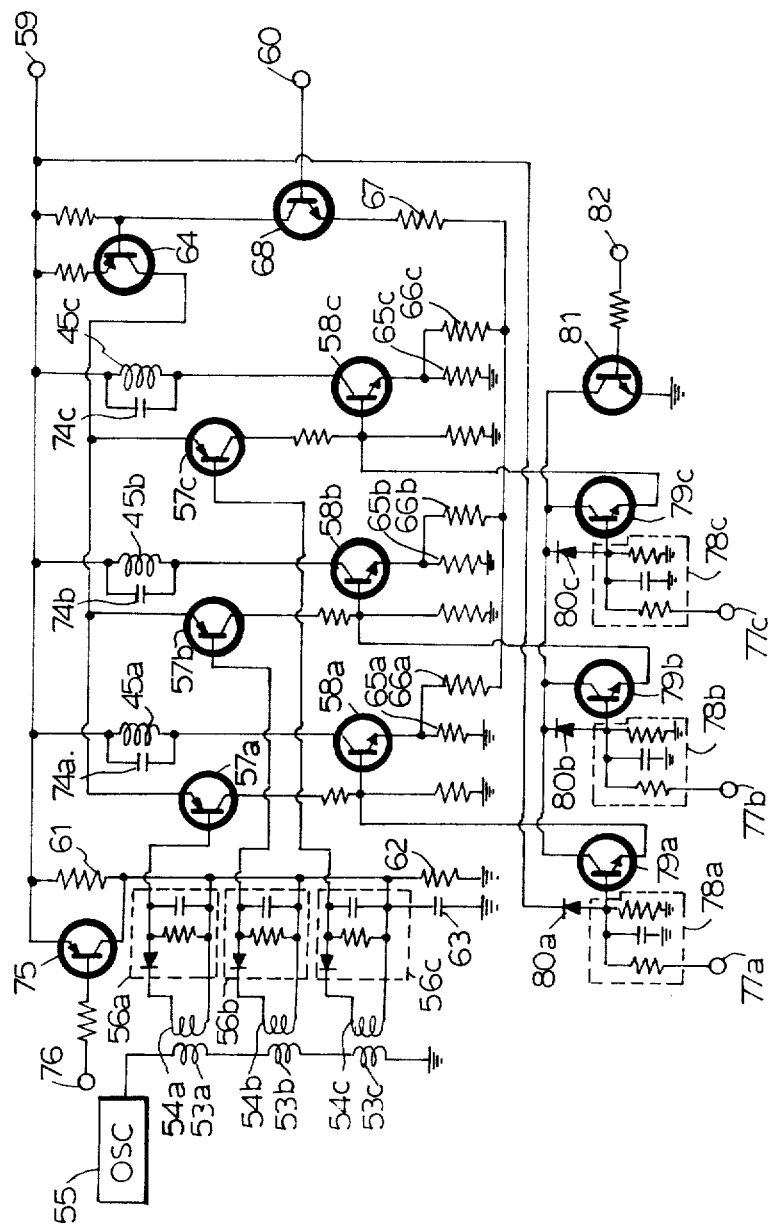
FIG. 3 is a circuit diagram of a driving circuit for the capstan motor of FIG. 2.

The driving circuit 39 for rotating the capstan motor 25 is shown in FIG. 3, in which when the necessary voltages are applied to terminals 59 and 60 and an oscillator 55 is operated, an AC signal therefrom is supplied to the group of the primary coils 53a, 53b and 53c and transmitted to one of the secondary coils 54a, 54b and 54c through the position detecting rotor 52. Terminal 76 must be connected to the power source by a switch (not shown) to cut off transistor 75, otherwise the bases of transistors 57a, 57b and 57c are reverse biased and no current will flow through the main winding from these transistors. When the position detecting rotor 52 is in a position where an electro-magnetic coupling is produced between the primary coil 53a and the secondary coil 54a close thereto, a larger AC signal than those induced in the other secondary coils 54b and 54c is transmitted to the secondary coil 54a, and that AC signal is converted into a DC signal through a rectifying and smoothing circuit 56a and applied to the base of a current switching transistor 57a. Taken together position detecting stator 51, position detecting rotor 52, primary coils 53, secondary coils 54 and rectifying and smoothing circuits 56 comprise a position detecting means. Therefore, only the transistor 57a becomes conductive, and a base current is supplied to an output transistor 58a and current flows to the main winding 45a. When current flows to the main winding 45a as described above, the rotor 48 and the position detecting rotor 52 rotate according to attraction and repulsion caused by that current and the magnet 47. Then, the position detecting rotor 52 comes to a position where an electro-magnetic coupling is produced between the primary coil 53b and the secondary coil 54b close thereto, and similarity to the above operation, current flows to the main winding 45b. By this operation, according to rotation of the rotor 48, the main windings 45a, 45b and 45c to which current flows are energized in turn and the rotor 48 rotates continuously.

In the above description it has been stated that necessary voltages are applied to a power source terminal 59 and a control input terminal 60. The control input terminal 60 is connected to the adder 38 shown in FIG. 1. Rectifying and smoothing circuits 56a, 56b and 56c corresponding to the secondary coils 54a, 54b and 54c, respectively are provided with necessary bias voltage by bias resistors 61 and 62. A bypass capacitor 63 is connected in parallel with the bias resistor 62. The current switching transistors 57a, 57b and 57c are connected in common at their emitters to a constant current transistor 64 so as to hold the other two transistors in the cut off state when one transistor is in a saturation state. The currents flowing through the output transistors 58a, 58b and 58c are provided out in a form of voltage by emitter resistors 65a, 65b and 65c. Feedback resistors 66a, 66b and 66c are also connected to the respective emitters of the output transistors 58a, 58b and 58c in order to decrease the deviation of the current amplification factor of these transistors and to determine the transfer conductance of the capstan motor driving circuit, i.e. the ratio of the change of current flowing in the main windings 45a, 45b and 45c relative to the change of voltage applied to the control input terminal 60, by the value of the resistor, and these resistors are connected to the emitter of a control transistor 68 through a resistor 67.

Now, referring to FIG. 2 again, the frequency generator 26 is mounted on the capstan motor 25 so as to generate a frequency proportional to the speed of rotation of the motor, as described hereinbefore. A gear 70 is mounted on the rotating shaft 46 on a boss 69, and an angle bar 73 is attached to the housing 43. In order to provide an AC signal corresponding to the number of the gear teeth, a magnetic head 71 and a ring magnet 72 are mounted on the angle bar 73. By this structure, the speed of rotation of the capstan motor 25 is detected, and it is rotated continuously under control of the electric circuit 39. Because the ring magnet 47 is magnetized with 16 poles and the position detecting rotor 52 has 8 projections, as described hereinbefore, current flows 8 times to each of the main windings 45a, 45b and 45c during one rotation of the capstan motor 25.

In FIG. 3, capacitors 74a, 74b and 74c are connected in parallel to the main windings 45a, 45b and 45c, respectively so as to prevent spike voltages. For stopping operation of the continuous rotation of the capstan motor 25, there is provided a transistor 75 and the collector and emitter thereof are connected across the bias resistor 61. When the terminal 76 is grounded, the transistor 75 is saturated and so the base of the current switching transistors 57a, 57b and 57c are given a reverse bias to the emitter. Then, current does not flow to the main windings 45a, 45b and 45c.

Now there will be described the case of rotating the capstan motor by the additional pulse. In this case, the terminal 76 is grounded and input terminals 77a, 77b and 77c are connected to the pulse generator 42 which is described in detail hereinafter. The input terminals 77a, 77b and 77c are connected to current amplifying transistors 79a, 79b and 79c through integrating circuits 78a, 78b and 78c, respectively, and the emitter of each of these transistors is connected to the base of the respective output transistors 58a, 58b and 58c. Elements 77, 78, 79 and 80 constitute an additional input means. In order to prohibit the driving of the capstan motor 25 by the additional pulse, there are provided diodes 80a, 80b and 80c connected to the respective integrating circuits 78a, 78b and 78c and a transistor 81. When a terminal 82 connected to the base of the transistor 81 is connected to the power source terminal 59, the transistor 81 is saturated and so the current amplifying transistors 79a, 79b and 79c are placed in a cut off state. Thus current amplifying transistors 79a, 79b and 79c operate to provide additional pulses to motor 25 only when terminal 82 is grounded. The situation when the capstan motor 25 is rotated by the additional pulse is basically the same as the case of a conventional pulse motor, and in the present invention as a method of exciting the main windings 45a, 45b and 45c, 1-2 phase excitation is employed taking into consideration of the step number of the capstan motor 25 and damping of rotation when being driven by the additional pulse. In addition, the state of rotation of the capstan motor 25 can be changed by connecting the terminals 76 and 82 in common to the power source terminal 59 or to ground terminals 76 and 82 together with transistors 75 and 81 constitute a driving source selecting means.

Figure 4:
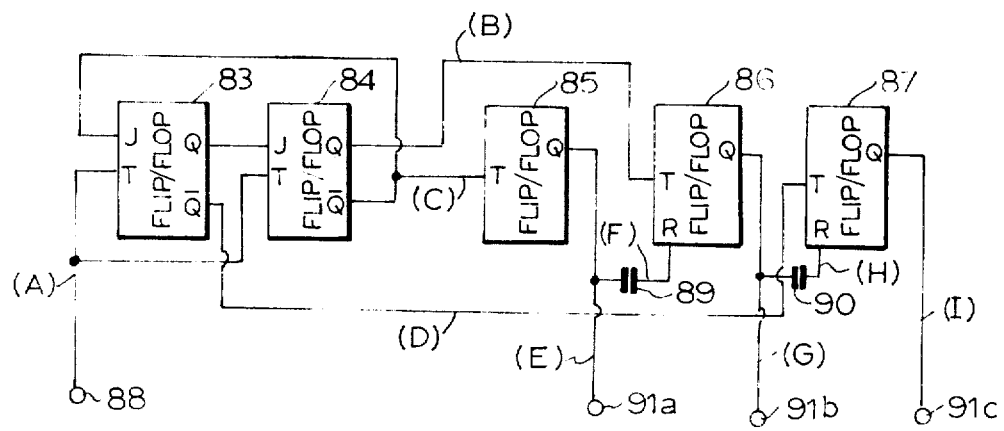
FIG. 4 is a circuit diagram of a three-phase pulse generator for providing pulses to the driving circuit of FIG. 3.

Next, there will be described what takes place when pulses are applied to the input terminals 77a, 77b and 77c. As described hereinbefore, the main windings 45a, 45b and 45c are wound in three phases, and thus the pulses to be applied to the input terminals 77a, 77b and 77c should have phases which are different from each other by $\frac{2}{3}\pi$ radian. The pulse generator 42 generates such a three phase pulse, and an embodiment of this circuit for use in the invention and the wave-shapes of the signals therein are shown in FIGS. 4 and 5, respectively. The pulse generator 42 comprises five J-K flip-flop circuits (hereinafter abbreviated as J-K.FF) 83 to 87.

Figure 5A:
FIG. 5A–5I are diagrams of waveforms of pulses for explaining the operation of the pulse generator of FIG. 4.
Figure 5B:
Figure 5C:
Figure 5D:
Figure 5E:
Figure 5F:
Figure 5G:
Figure 5H:
Figure 5I:

When a pulse signal A as shown in FIG. 5A is a-plied to an input 88 in FIG. 4 which is connected to the selection circuit 41 in FIG. 1, there are provided the following output signals to J-K.FF 83 and 84 which form a $\frac{1}{4}$ divider, i.e. pulse signals B, C and D for the Q-output of J-K.FF 84, the $\bar{Q}$-output of J-K.FF 84 and the Q-output of J-KFF 83, as shown in FIGS. 5B, 5C and 5D respectively. When these pulse signals B, C and D are applied to each input T of J-K.FF 85, 86 and 87, pulse signal E as shown in FIG. 5E is provided at the Q-output of J-K.FF 85. By applying the pulse signal E to a reset terminal R of J-K.FF 86 through a capacitor 89 to provide a waveshape F as shown in FIG. 5F, pulse signal G as shown in FIG. 5G is provided at the Q-output of J-K.FF 86. Further, by applying this pulse signal G to a reset terminal R of J-K.FF 87 through a capacitor 87 to provide a waveshape H as shown in FIG. 5H, pulse signal I as shown in FIG. 5I is provided at the Q-output of J-K.FF 87. These output pulse signals from J-KF.F 85, 87 and 86 are applied to the input terminals 77a, 77b and 77c in FIG. 3 through terminals 91a, 91b and 91c, respectively. As can be understood from the waveshapes of the pulse signals E, I and G in FIGS. 5E, 5I and 5G, the pulse signal E at the terminal 91a, the pulse G signal at the terminal 91b and the pulse signal I at the terminal 91c have phases different from each other by $\frac{2}{3}\pi$ radian. When the pulse signals each having a phase different from the other by $\frac{2}{3}\pi$ radian are applied to the input terminals 77a, 77b and 77c, current corresponding to the amplitude of these pulse signals flows to the main windings 45a, 45b and 45c, respectively. Because the main windings 45a, 45b and 45c are excited by a 1-2 phase excitation method, as described hereinbefore, the capstan motor 25 rotates one rotation when 48 pulses are applied to the pulse generator 42.

The integrating circuits 78a, 78b and 78c coupled between the input terminals 77a, 77b and 77c and the bases of the current amplifying transistors 79a, 79b and 79c, respectively are provided for slowing the rise time and fall time of the pulses of the signals applied to the input terminals 77a, 77b and 77c, for the following reason. In the case of the usual continuous rotation of the capstan motor 25, there is caused a back electromotive force proportional to the rotation speed of the capstan motor 25 at the main windings 45a, 45b and 45c. This is an AC voltage, the zero potential of which is the DC voltage applied to the power source terminal 59. On the other hand, the pulses of the signals applied to the input terminals 77a, 77b and 77c have a short rise time and fall time. When these pulses are directly applied to the current amplifying transistors 79a, 79b and 79c, because the impedance of the main windings 45a, 45b and 45c for the rise and fall portions of these pulses is mainly an inductance component, a very high voltage is induced at the main windings 45a, 45b and 45c and the output transistors 58a, 58b and 58c could be burned out by this induced voltage. If a diode is connected between the collector of the output transistors 58a, 58b and 58c and the power source terminal 59 in order to protect these output transistors against the above, described induced voltage, the back electromotive force described above is applied to this diode and current flows therethrough, and so the capstan motor 25 can not rotate continuously. Therefore, according to the invention, the above mentioned induced voltage is reduced by showing the rise and fall of the pulses applied to the input terminals 77a, 77b and 77c by the integrating circuits 78a, 78b and 78c. It is noted that the fact that the output transistors 58a, 58b and 58c do not operate in the saturation state is one of the reasons why the induced voltage can be lowered by suppressing the abrupt change of the pulses at the input.

The emitter resistors 65a, 65b and 65c are connected to the emitter of the output transistors 58a, 58b and 58c for the following reason. When the capstan motor is rotated by the pulse signal from the pulse generator 42, because the main windings 45a, 45b and 45c are excited by the 1-2 phase excitation method, as described hereinbefore, there exists a time when current flows to both main windings (45a and 45b, 45b and 45a, and 45c and 45a) at the same time. On the other hand, the current flowing to the main windings 45a, 45b and 45c is according to the pulse voltage applied to the output transistors 58a, 58b and 58c and the emitter resistors 65a, 65b and 65c. And, similarly to the case of operating the capstan motor 25 as a conventional brushless DC motor, a three-phase differential circuit is formed by connecting the emitter of the output transistors 58a, 58b and 58c with a common resistor instead of the emitter resistors 65a, 65b and 65c. Therefore, when the currents flow at the same time to the above described two main windings and when the amplitudes of the pulses applied to the input terminals 77a, 77b and 77c are slightly different from each other, the currents flowing to the two main windings become very different from each other. In the extreme case, the current flows only to one main winding, and so the step rotation angle of the capstan motor 25 changes about one step. For the above reason, the emitter resistors 65a, 65b and 65c, are provided for each of the output transistors 58a, 58b and 58c. The values of the feedback resistors 66a, 66b and 66c are made large enough compared with those of the emitter resistors 65a, 65b and 65c.

There will now be described the case of a standard I-type desive as referred to at the beginning of this specification, where the standard tape moving speed is 19.05 cm/sec. In this case, the speed of rotation of the capstan motor is 1200 rmp, and the number of gear teeth on the gear 70 is 192. On the other hand, the frequency of the signal from the wave-shaping circuit 9 is set to be 30 Hz, the same as the frame frequency of the video signal. At the rotation speed of 1200 rpm (20 rotations each second) of the capstan motor 25, the frequency of the signal provided from the magnetic head 71 shown in FIG. 2 becomes 3840 Hz (192×20). As explained with reference to FIG. 1, this signal is applied to the $\frac{1}{8}$ divider 28 and the $\frac{1}{8}$ divider 29 and there is selected from the selection circuit 30 a signal with a frequency of 240 Hz, and further the frequency is divided to 120 Hz through the bi-stable multivibrator 31. The second output having frequency of 120 Hz from the bi-stable multivibrator 31 is changed to a frequency of 60 Hz by the $\frac{1}{2}$ divider 35. This frequency is two times the frequency (30 Hz) of the wave-shaping circuit described above. When the tape moving speed is about 2.4 cm/sec, i.e. $\frac{1}{8}$ of the standard tape moving speed, the signal of the $\frac{1}{8}$ divider 28 is selected by the selection circuit 30. When the tape moving speed is about 1.2 cm/sec, i.e. 1/16 of the standard tape moving speed, the signal from the amplifier 27 is selected by the selection circuit 30. Accordingly, the frequency of the signal from the selection circuit 30 becomes constant regardless of the moving speed of the magnetic tape 7. The speed of rotation of the capstan motor 25 for the tape moving speed of 2.4 cm/sec and 1.2 cm/sec is 150 rpm and 75 rpm, respectively.

On the hand, when the capstan motor 25 is rotated by the pulse from the pulse generator 42 is as follows, as described hereinbefore, the capstan motor 25 rotates one rotation when the number of the pulses applied to the pulse generator 42 is 48. Therefore, in the case when the tape moving speed is about 0.6 cm/sec, i.e. 1/32 of the standard tape moving speed, the signal having frequency of 30 Hz from the wave-shaping circuit 9 is selected by the selection circuit 41. Then, the rotation speed of the capstan motor 25 becomes 37.5 rpm (30 Hz×60 sec/48 pulses=37.5 rpm) When the moving speed of the magnetic tape 7 is 1/64 of the standard tape moving speed, the selection circuit is connected to the $\frac{1}{2}$ divider 40. Therefore, there is no pulse applied to the pulse generator during a period when one magnetic track is formed by the rotary head assembly 6 (about a period of one field), and the tape is held stationary. Because the signal provided from the wave-shaping circuit 9 is used as the pulse to be applied to the pulse generator 42, when forming the magnetic tracks successively the number of the pulses applied to the pulse generator 42 during a period for forming each magnetic track is the same. The frequency dividing ratio of the first gate signal divider 19 is set to be ½, and that of the second to fourth gate signal dividers 20, 21 and 22 is set to be ¼, respectively.

Although the present invention is described hereinbefore as being for recording a video signal to the magnetic tape, in the case of reproducing the recorded video signal there is also provided the same tape moving speed as that of recording by using e.g. an oscillator providing a signal having a frequency of 30 Hz instead of the output signal from the wave-shaping circuit 9. Of course the method of reproducing the video signal recorded on the magnetic tape 7 is the same as that of a conventional magnetic recording and reproducing device.

As described hereinbefore, according to the present invention, for the motor for moving the magnetic tape, there is provided a first rotating state where the current flowing to the main windings which generate the driving torque is switched by the signal indicating the rotational position of the rotor, and a second rotating state where the current flowing to the main windings is switched by an additional pulse. As a matter of design choice the first state in which the rotation phase of the motor is used to control the current applied to the main windings is used for the range of tape moving speeds from the standard tape moving speed to the lowest speed at which the playback of the audio signal can be processed practically. Also as a matter of design choice the second state in which the motor is driven by additional pulses is used for tape moving speeds slower than the lowest speed at which the playback of the audio signal can be practically processed. Because the same reference signal is used for both states, the motor is rotated synchronously with the reference signal, and so the tape moving speed can be advantageously changed accurately over a wide range. Further, there are the advantages that wow and flutter characteristics of the audio signal can be improved by maintaining the linearity of the magnetic track, that the interval between the adjacent magnetic tracks can be kept equal, and that the amount of power consumed power for driving the magnetic tape is small.

What is claimed is:

1. A tape driving system for a magnetic recording and reproducing apparatus in which a video signal is recorded intermittently by a rotary magnetic head and an audio signal is recorded continuously on a magnetic tape, respectively, said system comprising:
    a brushless DC motor for moving the magnetic tape at various tape moving speeds and having a rotor, a stator core having main windings wound thereon and opposed to said rotor and a position detector for detecting the rotational position of said rotor and producing a rotor position signal;
    a pulse generating means for generating a pulse signal;
    an integrating circuit connected to said pulse generating means for producing a modified pulse signal from said pulse signal by slowing the rise time and the fall time of said pulse signal;
    a driving source selecting means having a first input connected to said position detector, a second input connected to said integrating circuit and an output, for selectively connecting said rotor position signal or said modified pulse signal to said output thereof; and
    a current supply means connected to said output of said driving source selecting means and said brushless DC motor, for supplying current to said main windings of said brushless DC motor according to said signal supplied thereto by said output of said driving source selection means, whereby said brushless DC motor is driven as a conventional brushless DC motor in a high speed range of tape moving speeds when said rotor position signal is applied thereto and said brushless DC motor is driven as a pulse motor in a low speed range of tape moving speeds when said modified pulse signal is applied thereto, the highest speed in said low speed range being lower than the lowest speed in said high speed range.

2. A tape driving system according to claim 1, wherein said position detector comprises a current switching transistor, and said current supply means includes a voltage exchanging means for changing the base voltage of said current switching transistor to a reverse bias to the emitter thereof for cutting off the current supply from said position detector to said current supply means.

3. A tape driving system according to claim 1, wherein said pulse generating means is a three-phase pulse generator comprising: a ¼ divider composed of first and second J-K flip-flop circuits, the T-input terminals of said first and second J-K flip-flop circuits being connected in common, the $\bar{Q}$-output terminal of said first J-K flip-flop circuit being connected to the J-input terminal of said second J-K flip-flop circuit, and the $\bar{Q}$-output terminal of said second flip-flop circuit being connected to the J-input terminal of said first J-K flip-flop circuit; a first T flip-flop circuit having the T-input terminal connected to said Q-output terminal of said second J-L flip-flop circuit; a first and a second differentiation circuit; a second T flip-flop circuit having the T-input terminal connected to said Q-output terminal of said J-K flip-flop circuit and a reset terminal connected to the Q-output terminal of said first T flip-flop circuit through said first differentiation circuit; and a third T flip-flop circuit having the T-input terminal connected to the $\bar{Q}$-output terminal of said J-K flip-flop circuit and a reset terminal connected to the Q-output terminal of said second T flip-flop circuit through said second differentiation circuit; whereby when an input signal having a frequency lower than the filed frequency of the video signal is applied to said common T-terminals of said first and second J-K flip-flop circuits, output pulses having a phase different from each other by ⅔π radian are provided at said Q-output terminals of said first, second and third T flip-flop circuits, respectively.

* * * * *